(12) United States Patent
Kalinsky

(10) Patent No.: US 6,848,347 B1
(45) Date of Patent: Feb. 1, 2005

(54) MULTI-SPINDLE MACHINE

(75) Inventor: Robert M. Kalinsky, Broadview Heights, OH (US)

(73) Assignee: Logan Clutch Corporation, Westlake, OH (US)

( * ) Notice: Subject to any disclaimer, the term of this patent is extended or adjusted under 35 U.S.C. 154(b) by 531 days.

(21) Appl. No.: 09/773,366

(22) Filed: Jan. 31, 2001

Related U.S. Application Data

(60) Provisional application No. 60/180,328, filed on Feb. 4, 2000.

(51) Int. Cl.[7] .................................................. B23B 1/00
(52) U.S. Cl. .......................................... 82/1.11; 82/118
(58) Field of Search ........................ 82/1.11, 110, 126, 82/127, 143

(56) References Cited

U.S. PATENT DOCUMENTS

| | | | | |
|---|---|---|---|---|
| 3,722,048 A | * | 3/1973 | Schubert | 279/51 |
| 3,747,444 A | * | 7/1973 | Schubert | 82/129 |
| 3,760,661 A | * | 9/1973 | Eichenhofer | 82/126 |
| 4,644,819 A | * | 2/1987 | Zugel | 192/48.9 |
| 4,942,650 A | * | 7/1990 | Howarth | 29/38 B |
| 5,044,055 A | * | 9/1991 | Howarth et al. | 188/68 |
| 5,076,123 A | * | 12/1991 | McConkey | 29/53 |
| 5,676,031 A | * | 10/1997 | Manning | 409/218 |
| 5,730,037 A | * | 3/1998 | Manning | 408/5 |
| 5,910,201 A | * | 6/1999 | Muscarella et al. | 82/129 |
| 5,953,970 A | * | 9/1999 | Haller et al. | 82/118 |
| 6,044,736 A | * | 4/2000 | Cucchi | 82/127 |
| 6,050,162 A | * | 4/2000 | Kalinsky | 192/48.8 |
| 6,148,976 A | * | 11/2000 | Kalinsky | 192/109 F |
| 6,272,955 B1 | * | 8/2001 | Scemama | 82/124 |

* cited by examiner

*Primary Examiner*—A. L. Wellington
(74) *Attorney, Agent, or Firm*—Ralph E. Jocke; Daniel D. Wasil; Walker & Jocke

(57) ABSTRACT

The invention relates to a multi-spindle machine system having a control arrangement for selectively slowing down the speed of a stock feeder mechanism. The machine is operable at a low speed or a high speed. A braking arrangement for slowing the advance of stock is operative responsive to a machine controller. The feeder mechanism is slowed prior to engagement of feed stock with a stock stop device. The operation of the system of the present invention enables slowing the feed stock during its feeding into the machine to reduce stock bounce back to ensure more accurate initial positioning of the stock in the machine. The braking arrangement may comprise a machine brake clutch and/or a snubbing clutch.

20 Claims, 5 Drawing Sheets

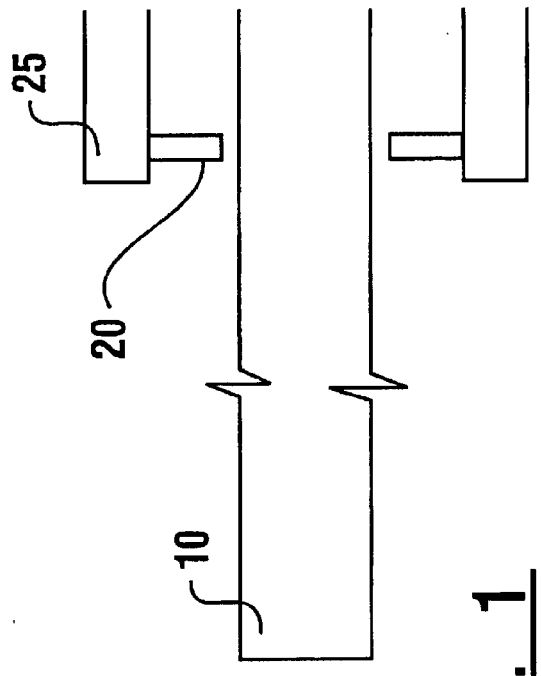
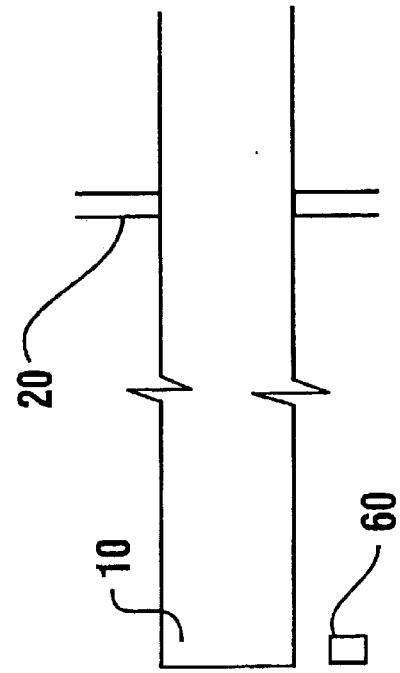
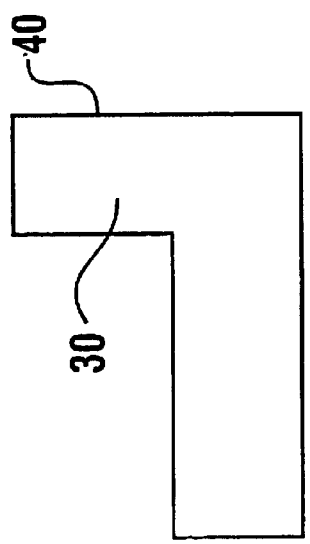
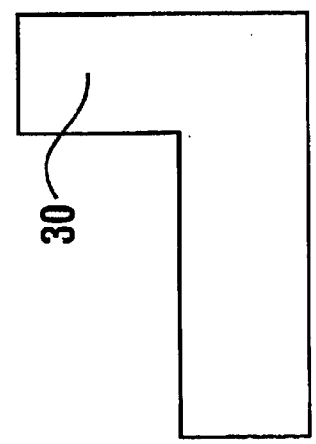
FIG. 1
FIG. 2

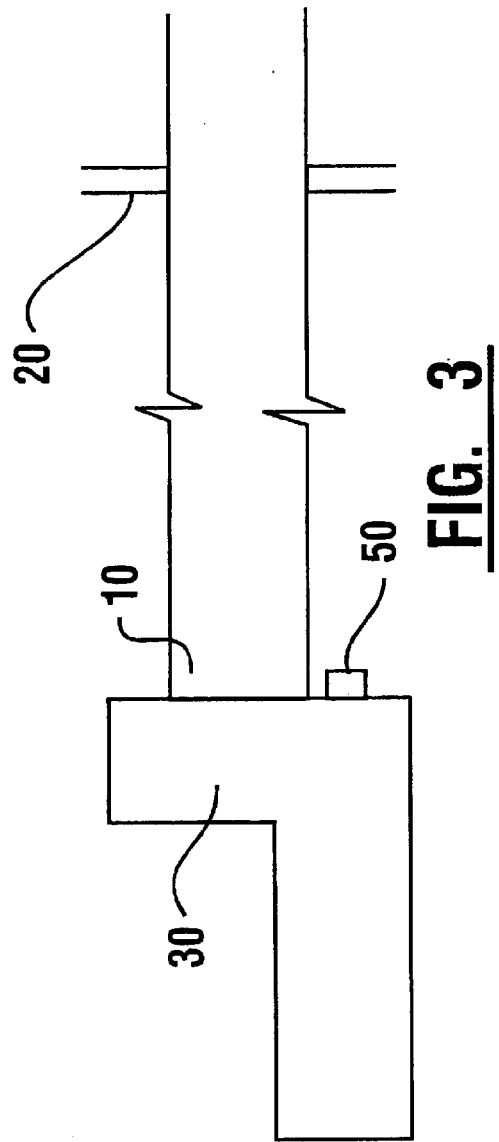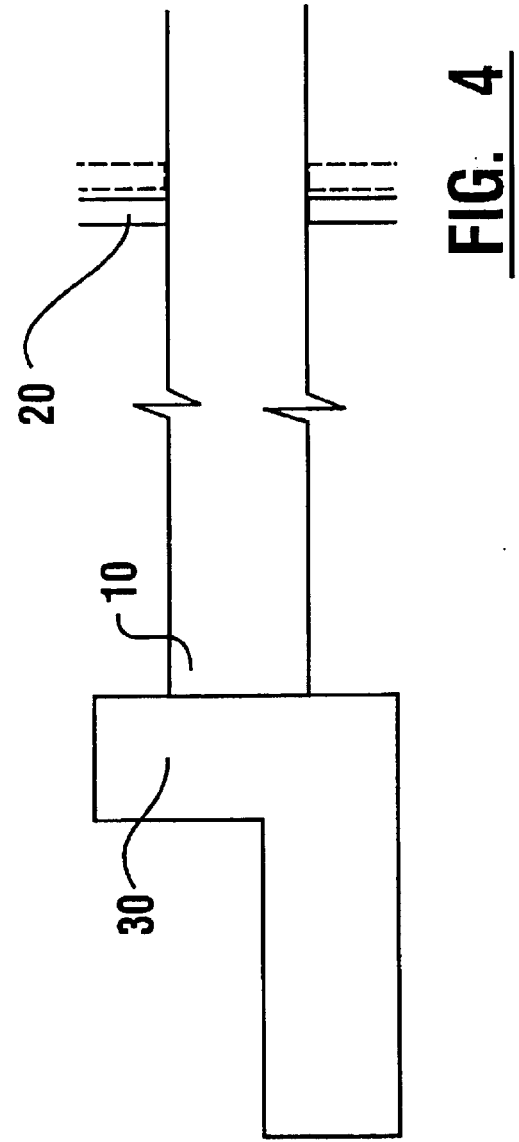

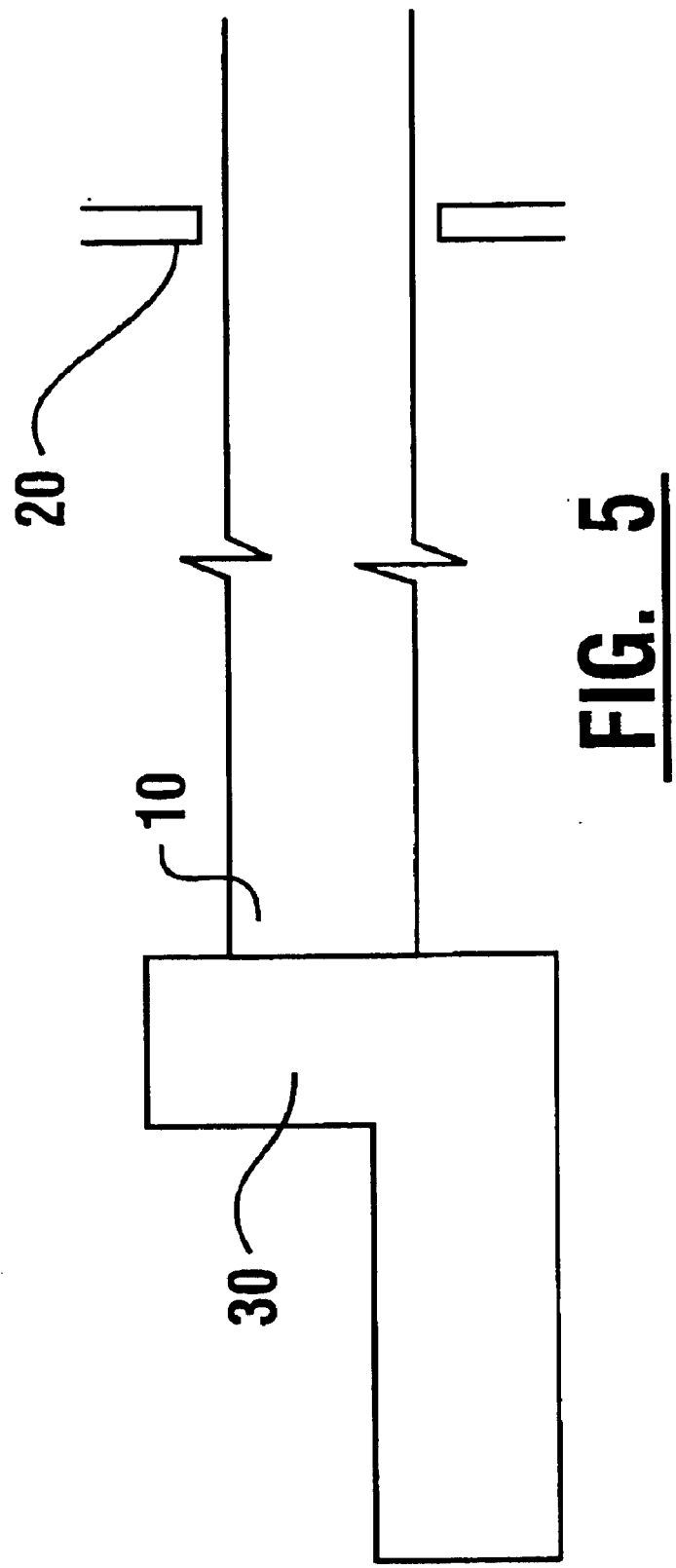

US 6,848,347 B1

MULTI-SPINDLE MACHINE

CROSS REFERENCE TO RELATED APPLICATION

This application claims the benefit of U.S. Provisional Application No. 60/180,328 filed Feb. 4, 2000.

TECHNICAL FIELD

This invention relates in general to multi-spindle machines. Specifically, this invention relates to a multi-spindle machine having a high speed/low speed system that enables a brake induced low speed stock feeding operation to minimize stock bounce back to ensure an accurate initial positioning of the stock in the machine.

BACKGROUND ART

Multi-spindle machines are known in the prior art. Multi-spindle machines are used to mass produce standardized types of components. A multi-spindle machine typically has several work stations at which machining operations are performed. A piece of raw stock, such as a bar stock, enters the machine at a first station and as the machine indexes, various machining operations are performed. Once the station is indexed completely through the machine, a completed part is formed. The part is released, and the process is repeated for that station with a new piece of raw stock. An advantage of multi-spindle machines is that all stations in the machine are producing parts simultaneously, resulting in higher rates of production.

Multi-spindle machines (also referred to as multiple spindle machines) typically have a large indexing drum with four, five, six or eight stations thereon. Each of the stations carries a work piece. In all but one of the stations, where a new piece of stock enters, a machining operation is typically performed. After each machining operation is completed, the drum is rotated so that each work piece moves sequentially through the locations where the various machining operations are performed. Machining operations that are typically performed at a multi-spindle machine include milling, turning, and threading.

Most multi-spindle machines are very efficient in terms of producing standardized parts at a high rate. However, one drawback associated with a multi-spindle machine is that the entire machine operates off of a single main motor. The main motor simultaneously drives all of the devices and processes in the machine. Multi-spindle machines typically include a timing shaft with cams for the coordination of multiple machine operations.

There is always a risk that one of the mechanisms within the machine will not function properly. If such a malfunction should occur and not be detected by an operator in time to shut the machine off, the machine will continue with its next cycle. In such a case, an attempt by the machine to index to its next position could cause severe damage. This is why it is common for an operator to be required to closely monitor multi-spindle machines.

Typically, the speed of multi-spindle machines changes from high to low speed and back again during the course of the operating cycle. High speed is normally used for times in the machine cycle when critical machining operations are not occurring. High speed operation is desirable when the stations are indexing, or when the tools are moving toward or away from the work pieces and are not performing work thereon. Low speed operation is used when the tools in the machine are forming the metal. Any attempt to operate the machine at a high speed when such forming work is occurring is likely to cause a problem or jam the machine.

It is the responsibility of the operator or set-up technician to set the points in the machine cycle where the machine makes its high speed and low speed shifts. Shifting from high speed too early results in slower cycle times and production rates. Similarly, the same result occurs if the shift from low to high speed is made too late. However, as previously discussed, if the shift from high to low speed is made too late (or the shift from low to high speed too early) this can result in damage to the machine, the tooling, or the work piece.

A co-pending patent application titled Multi-Spindle Machine Retrofit System which is U.S. patent application Ser. No. 08/871,019 filed on Jun. 6, 1997, and its contents hereby incorporated by reference, describes a multi-spindle machine that uses a high and low speed system with a brake that decreases the cycle time, minimizes wear on the drive train gears, and enables a more effective operation of a multi-spindle machine. That multi-spindle machine retrofit system includes a control system for optimizing machine performance.

U.S. Pat. No. 5,730,037 filed on Apr. 17, 1995 and titled Multi-Spindle Machine Control System relates to a control system for optimizing multi-spindle machine performance. The patent describes use of a sensor in the proper positioning of stock that is fed into the multi-spindle machine. This patent and its contents are hereby incorporated by reference.

U.S. Pat. No. 5,676,031 filed on Apr. 17, 1995 and titled Apparatus For Detecting Stock relates to a multi-spindle machine. The patent describes a stock feeder arrangement having stock detection in a multi-spindle machine. This patent and its contents are hereby incorporated by reference.

U.S. Pat. No. 4,644,819 describes a high-low speed drive system for multiple spindle machines employing selective engagement and disengagement of associated pneumatic operated disc clutches.

U.S. Pat. No. 6,148,976 filed on Jun. 3, 1999 and titled Multi-Spindle Machine High Speed/Low Speed System, and its contents hereby incorporated by reference, describes a high and low speed system (also referred to as high/low speed) with a brake for a multi-spindle machine that decreases the cycle time, minimizes wear on the drive train gears, and enables a more effective operation of a multi-spindle machine. The high/low speed system includes the ability to selectively vary torque capacity to certain clutches with an adjustable pressure control. The system decreases the cycle time between high and low speeds.

With the prior art multi-spindle machines high speed operation is ongoing during feeding of new stock, such as a bar stock, into the machine. Generally multi-spindle machines include a stock stop device which acts to halt the advance of stock fed through a spindle by a stock feeder mechanism. These devices typically comprise a member, such as a plate or bolt, which may be fixed or otherwise accurately placed so that the stock is stopped at a desired distance from the forward edge of the spindle. These prior art devices often absorb the full impact of stock advancing during high speed machine operation. It has been discovered that because of the feeding of stock during high speed machine operation, the stock may hit the stop and bounce back from the stock stop device. This has sometimes led to the stock being held by the spindle collets in an inaccurate initial position. Hence, the stock is not properly positioned during machine operations. This may result in damage to tooling and the manufacture of defective parts.

Thus there exists a need for a multi-spindle machine having a high and low speed system that enables the feeding of stock at a lower speed during engagement of the stock and the stock stop device in order to provide more accurate positioning of the stock in the machine. Particularly, such a system would be preferably suited for retrofit on a Davenport Model B multi-spindle machine.

DISCLOSURE OF INVENTION

It is an object of the present invention to provide an arrangement that stops stock at a predetermined position when the stock is advanced by a stock feeder in a multi-spindle stock forming machine.

It is a further object of the present invention to provide a multi-spindle machine with a high/low speed system that minimizes or prevents feed stock bounce back to provide accurate initial positioning of stock in the machine.

It is a further object of the present invention to provide a multi-spindle machine high/low speed system that lowers the speed of stock during feeding of the stock into a multi-spindle machine.

It is a further object of the present invention to provide a multi-spindle machine high/low speed system that uses a brake arrangement to lower the speed of stock prior to engagement of the stock and a stock stop device during the feeding of the stock into a multi-spindle machine.

It is a further object of the present invention to provide a multi-spindle machine high/low speed system capable of being retrofit to enhance the feeding of stock into the machine.

Further objects of the present invention will be made apparent following the Best Modes for Carrying Out Invention and the appended claims.

The foregoing objects of the present invention are accomplished in an exemplary embodiment by a multi-spindle machine that has a high/low speed system which employs a lower speed during stock feeding. The feed stock is slowed down prior to the stock engaging the stock stop device. The speed of the feed stock may be slowed using a brake arrangement, such as a brake or a low speed clutch. The machine may be returned to high speed operation after the stock is properly positioned against the stop in the machine. Alternatively, the machine may be kept at the slower speed until the next machine cycle.

The present invention may be used with a high/low speed system for a multi-spindle machine. The multi-spindle machine may include a low speed drive train and a high speed drive train which drive the components of the multi-spindle machine at separate times. Both the low speed drive train and the high speed drive train are driven by a main motor, and drive the machine components through a common power drive train. The multi-spindle machine may include a starting/feed clutch, a brake clutch, a snubbing clutch, and a high speed clutch. An arrangement and operation of a multi-spindle machine including the clutches is described in the above incorporated by reference U.S. patent application Ser. No. 09/325,247 filed on Jun. 3, 1999.

In operation of the exemplary multi-spindle machine, a machine stock feeding sequence may include the following steps: feeding stock into the machine at high speed; engaging a brake to slow the speed of the machine and hence the speed of the advancing feed stock; completing the feeding of stock into the machine at the slower speed until a proper feed position is achieved; and returning the machine to high speed operation.

BRIEF DESCRIPTION OF DRAWINGS

FIG. 1 is a showing of a stock feeder arrangement prior to stock engagement with a feeder mechanism gripping device.

FIG. 2 is a showing of the stock feeder arrangement of FIG. 1 with the gripping device engaged with the stock.

FIG. 3 is a showing of the stock feeder arrangement whereby the stock has been moved into engagement with the stock stop device by the gripping device.

FIG. 4 is a showing of the stock feeder arrangement with the gripping device moved an additional distance on the stock.

FIG. 5 is a showing of the stock feeder arrangement of FIG. 5 with the gripping device released from the stock.

BEST MODES FOR CARRYING OUT INVENTION

As previously discussed, because of the feeding of stock during high speed machine operation, it has been discovered that on occasion the stock may bounce back from a stock stop device. This has led to the stock being held in the spindle in an inaccurate initial position. Hence, the stock is not properly positioned during machine operations. The present invention reduces the likelihood of the stock being improperly positioned as a result of bounce back.

An object of the present invention is accomplished by a multi-spindle machine that has a high/low speed system which employs a lower speed during stock feeding. The feed stock is slowed down prior to the stock engaging the stock stop device. Hence, bounce back of the stock from the stock stop device is minimized or eliminated. This permits the stock to be fed into the machine and held at the correct position for machining operations.

The speed of the advancing feed stock may be slowed down using a braking arrangement, such as a brake and/or a low speed clutch, of the multi-spindle machine. The advancement of the stock may be slowed just prior to engagement of the stock with the stock stop device, or the entire feeding operation may be slowed. Furthermore, the machine may be returned to high speed operation after it is determined that the feed stock is properly positioned in the machine. Alternatively, the machine may be kept at the slower speed until the next machine cycle.

Figure 6:
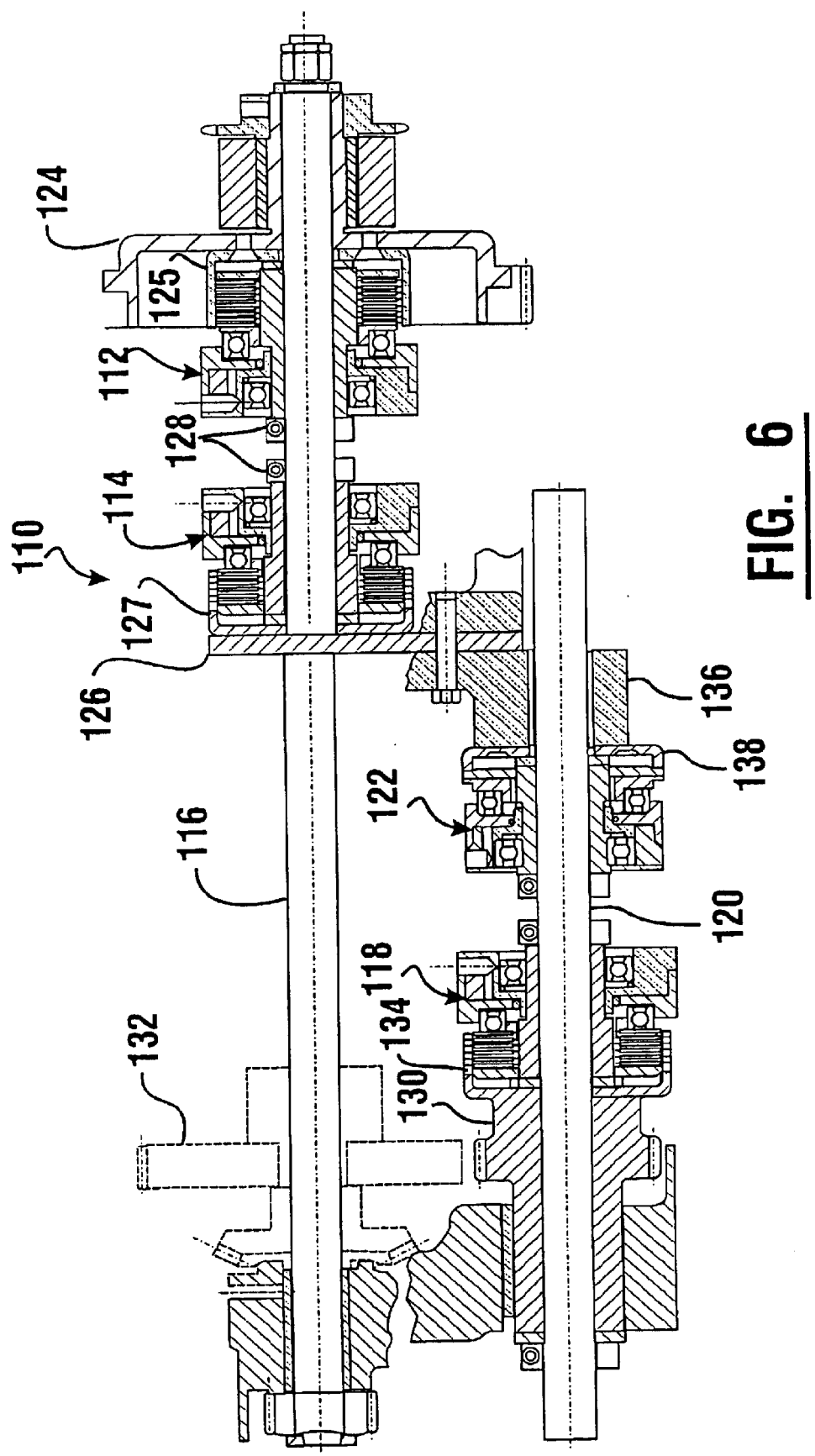
FIG. 6 is a sectional illustration of a portion of a multi-spindle machine incorporating a high/low speed system with a brake arrangement in accordance with a preferred embodiment of the present invention.

FIGS. 1–5 show an exemplary operation for the feeding a stock piece for use in a multi-spindle machine. It is to be understood that the present invention is not limited to the feeding arrangement shown in FIGS. 1–5, but the present invention can be applied with any feeding arrangement for use in feeding of stock into a multi-spindle machine having high and low speeds. FIG. 6 shows a portion of a multi-spindle machine incorporating a machine control system 110 having a high/low speed system with a brake arrangement. The brake arrangement may be used to slow the speed of the stock during the feeding operation.

FIG. 1 shows a stock feeder arrangement for feeding a piece of raw stock 10 into a multi-spindle machine. A feeder mechanism stock advancing device, such as a gripping device 20 is adapted to grip and advance the stock, such as a bar stock, into the multi-spindle machine. A feeder mechanism 25 comprises the gripping device 20. It should be understood that other feeder mechanism advancing devices may be used for advancing the stock into the machine during the stock feeding operation. For example, the feeder mechanism may comprise a device for advancing the stock by pushing against the end of the stock, by moving supporting rollers or though other types of moving mechanisms.

FIG. 1 shows the stock feeding arrangement prior to a bar stock 10 being engaged by the feeder mechanism gripper device 20. The gripping device 20 may comprise any type of component capable of gripping or holding stock for the advancement of the stock into a multi-spindle machine. For example, the gripping device may comprise gripper fingers or a collet.

The stock is fed into a spindle by the stock feeder mechanism, which can be either incorporated into the stock forming machine or operated separately therefrom. The stock feeder mechanism advances the stock through a machine spindle and into engagement with the front face 40 of a stock stop device 30. The stock stop device 30 may be fixed or movable. For example, the stock stop device 30 may comprise a piston. The position of the stock stop device 30 or the face 40, relative to a spindle of the machine, may be adjustable to allow for adjustment of the initial position of the stock in the machine. The face 40 may comprise a component, such as a spring or an absorber, for engagement with the stock 10.

A stock detector may be used in some embodiments to detect the presence and position of the stock. The stock detector may comprise a part of the feeder mechanism, the gripping device 20, and/or the stock stop device 30. The stock detector may comprise one or more sensors, such as pressure sensors and/or proximity sensors, to detect the presence and position of the stock. The stock detector may be used to determine when the stock is in a correct insertion position. The stock detector may signal the machine controller, which may include a processor, that the positioning of the stock has been completed. The controller can use the signal to stop the stock feeder mechanism from advancing the stock, or for other purposes. Once in the detected correct position the stock can then be held in the spindle by a spindle collet. The stock feeder mechanism may release the stock before or after the spindle collet holds the stock. The operation of a spindle collet is known in the prior art. Alternatively no stock detector may be used and the machine may rely on the operation of the feeder to assure reliable advance of the stock piece.

FIG. 2 shows the stock 10 gripped by the gripping device 20. It should be understood that in the area between the broken line of the stock 10 may be located other machine components, such as the spindle. FIG. 2 shows the stock 10 gripped and advanced from its position in FIG. 1.

FIG. 3 shows the stock 10 advanced into engagement with the front face 40 of the stock stop device 30. A stock position detection sensor 50 is shown located adjacent the face 40 of the stock stop device 30.

FIG. 4 shows the gripping device 20 attempting to continue advancing the stock 10 even though the stock 10 is in stopped abutting engagement with the face 40. The broken lines in FIG. 4 indicate the position in FIG. 3 of the gripping device 20. The continued advancement of the gripping device 20 beyond the point where the stock engages the stop may be used to ensure that the stock 10 is in engagement with the face 40 of the stock stop device 30 at completion of the feeding operation. This assures more accurate positioning of the stock 10 into the machine. Sensors may be used to detect that the gripping device 20 is sliding along the outer surface of the stock 10. The sensors may comprise proximity sensors located in the feeder mechanism capable of determining the distance traveled by the gripping device 20, or they may comprise pressure sensors located on the gripping device 20 capable of determining that the gripping device is sliding. Furthermore, the gripping device 20 may be attached, such as by an arm, to a component of the feeder mechanism in such a way that the gripping device 20 remains gripped to the stock 10 and the component of the feeder mechanism does the sliding relative to the gripping device 20. Sensors may be used to detect the sliding of the feeder mechanism component. Alternatively the feeding distance may be set to assure some sliding each time the stock is advanced and no sensing of the sliding is required.

In embodiments of the invention the controller may use the signals from the sensors 50 and/or the sensors that detect gripper sliding to stop the stock feeder mechanism from advancing the stock, or for other purposes. Alternatively the machine may be set up to achieve adequate stock advance on each cycle and sensing of the advance of the stock or the sliding may not be conducted.

FIG. 5 shows the stock 10 in engagement with the front face 40 while the gripping device 20 is released from the stock 10. In this position the stock is ready to be engaged by the collet so that machining may begin.

In an exemplary embodiment of the present invention the spindle machine applies a braking operation so that the stock 10 contacts the stock stop device 30 at a lower speed than would otherwise occur during high speed machine operation. Hence, bounce back of the stock from the stock stop device is reduced, minimized, or eliminated. A braking operation may be set such that the stock is accurately positioned in the machine with minimal braking. A machine controller may be used to apply the braking operation to slow the speed of the stock advance during the feeding operation. The timing of the braking operation may be set into the timing of the machine. Alternatively, the timing of the braking operation may be based on a detected position of an end or other portion of the stock during the feeder operation.

As shown in FIG. 2, a stock position detection sensor 60 may be positioned adjacent to the path of the stock to detect the stock. The sensor 60 may signal the machine controller that the stock has reached its predetermined braking position. The controller, upon receiving the signal from sensor 60, may then employ the brake arrangement to slow the speed of the machine including the stock feeder mechanism, and thus the advance of stock. Alternatively, the sensor 60 may be in direct communication with the brake arrangement to initiate the braking operation. Therefore, as previously discussed, the slowing of the advancing stock ensures an accurate initial positioning of the stock in the machine.

The stock position detection sensor may comprise proximity sensors located in the feeder mechanism which are capable of determining the distance traveled by the gripping device 20, and thus the stock. For example, the gripping device 20 may be attached, such as by an arm, to a component of the feeder mechanism. The sensor may detect the advanced position of the component which corresponds to the advanced position of the stock.

There are several situations when the machine may return to full high speed operation after the braking operation. For example, full high speed operation may resume after the stock 10 engages the stock stop device 30; after the gripper device 20 slides; or after the spindle collet grips the stock. Also, the machine may stay at the lower speed until the next machine cycle.

It should be immediately apparent that the present invention is equally applicable to any multi-spindle machine having a high/low speed system capable of employing a brake arrangement. For example, the portion of the multi-spindle machine depicted in FIG. 6 applies to a Davenport Model B five spindle automatic screw machine, to which the present invention is applicable.

Figure 7:
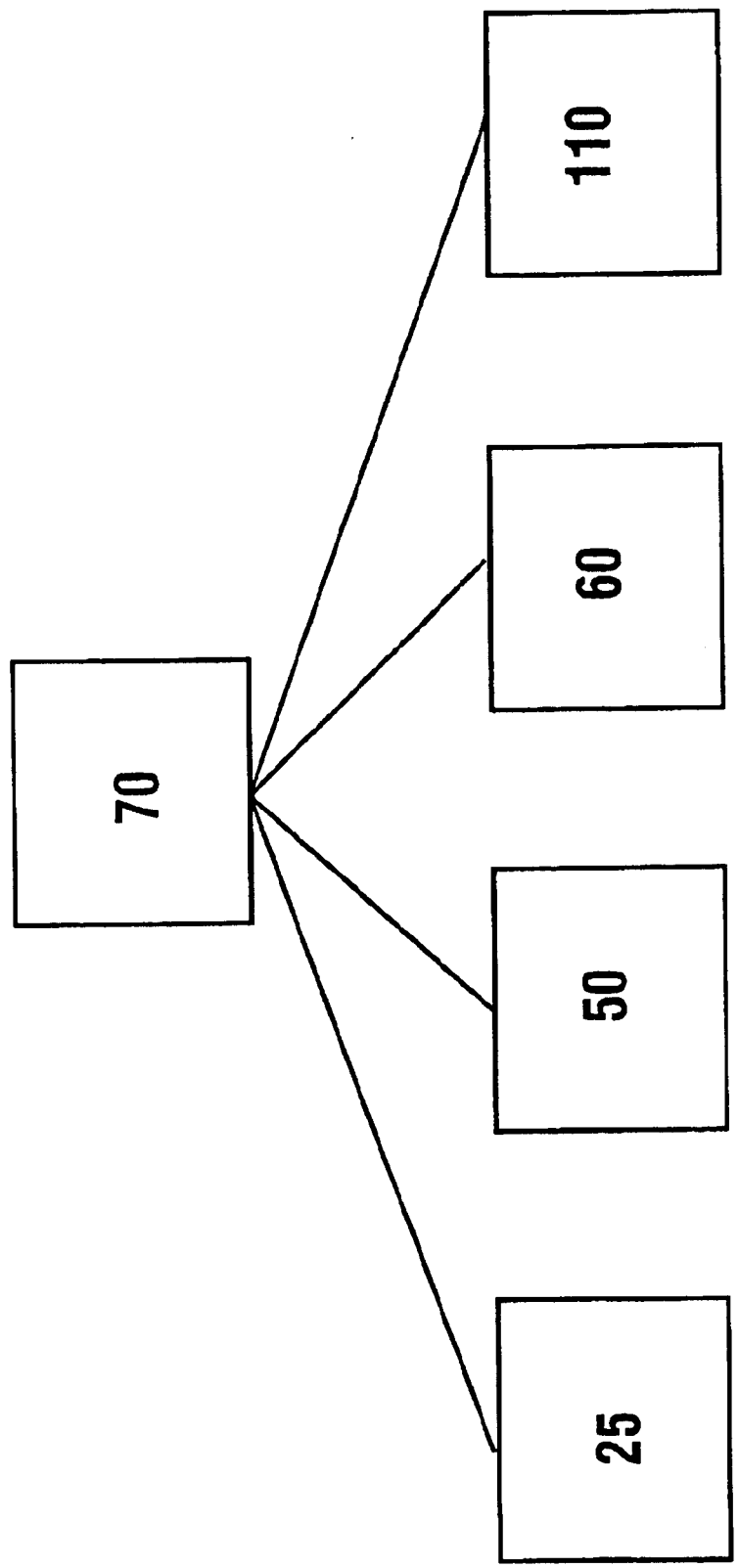
FIG. 7 is a showing of an operative relation of the machine controller.

Referring now to FIG. 6, there is shown a portion of a multi-spindle machine incorporating a machine control system 110 having a high/low speed system with a brake arrangement. A machine controller may employ the control system 110 to apply a braking operation to slow the speed of the stock during the feeding operation. The machine controller 70 may be in operative relation with the feeder mechanism 25, sensors 50, sensors 60, and control system 110, as shown in FIG. 7.

A starting/feed clutch 112 together with machine brake/clutch 114 are positioned on one end of the starting clutch drive shaft 116. Attached at an opposite end of the starting clutch drive shaft 116 is a quick index drive gear 132 shown in phantom line for engagement with the gears controlled by the high speed clutch 1118. High speed clutch 118 is positioned on the long worm drive shaft 120 along with snubbing clutch 122 spaced axially therefrom.

As is known to those skilled in this art, a multi-spindle machine includes in its power feed train a main motor and main motor sprocket (not shown) that engages and drives a main motor pulley. The power feed train of the multi-spindle machine incorporates a series of pulleys, gears and shafts for a high speed drive train and a low speed drive train. Both the high speed and low speed drive trains selectively act to drive the main drum shaft (not shown) of the machine. The main drum shaft is part of the power drive train which drives the part forming components of the machine. The low speed drive train consists of a plurality of reducing gear couples which act to substantially reduce rotational speed from that of the pulley shaft. Co-pending patent application titled Multi-Spindle Machine Retrofit System application Ser. No. 08/871,019 filed on Jun. 6, 1997 discusses a power drive train of a prior art multi-spindle machine in detail.

Either the low speed drive train or the high speed drive train propels the power drive train of the multi-spindle machine at any one time. This is normally accomplished by having the low speed drive train always operable while the high speed drive train is selectively engaged. A rolling or running clutch is usually provided to allow a constant speed shaft to rotate at a higher speed when necessary to enable the high speed rotation.

Returning now to FIG. 6, the multi-spindle machine advantageously provides starting/feed clutch 112, machine brake clutch 114, high speed clutch 118, and snubbing clutch 122. All of the clutches may be pneumatically actuated and electronically controlled, multi-disc friction clutches. All of the clutches may be controlled to engage and disengage through pressure supplied through solenoid valves. Additionally, all of the clutches may have an adjustable torque capacity directly dependent upon variable fluid pressure. Therefore, these components are controllable independent of the machine cams on which the timing of the other machine component operations are dependent. The ability to vary torque capacity allows more efficient operation of the multi-spindle machine and to customize various machining operations. Further, the ability to selectively control pressure and as a result torque capacities for the individual clutches provide more efficient operation and better quality control. A computer or microprocessor (not shown) in communication with pressure control valves allows a programmable manufacturing operation with reduced potential for human operator error or need for human intervention during a machining process.

Starting/feed clutch 112 as previously mentioned may be a pneumatically operated multi-disc friction clutch. The clutch 112 may be an eight disc clutch that has a torque capacity of about 462 foot pounds (ft. lbs.) at about 80 pounds per square inch (psi) of pressure. Starting/feed clutch 112 is positioned at one end of starting clutch drive shaft 116. Starting/feed clutch 112 is anchored to a driving gear 124 with suitable fasteners known in the art. Clutch 112 is operative to cause friction discs to engage cup 125 connected to gear 124.

There is also positioned on starting clutch drive shaft 116 a machine brake clutch 114 which may also be a pneumatically operated multi-disc friction clutch which has the ability to function as a brake. The machine brake clutch 114 may be a standard capacity six disc brake which has a torque capacity of about 245 foot pounds at about 80 psi. Machine brake clutch 114 is positioned relatively adjacent starting feed clutch 112 on the same end of the starting clutch drive shaft 116, but is spaced therefrom and mounted to a fixed bracket 126 with suitable fasteners. Machine brake clutch 114 is operative to cause friction discs to engage cup 127 of bracket 126. Additional clamps 128 are provided at the other ends of the starting feed clutch 112 and machine brake clutch 114 for securing them on shaft 116.

The high speed clutch 118 may be a pneumatically operated multi-disc friction clutch which is positioned on the long worm drive shaft 120. Gear 130 on long worm drive shaft 120 meshes with the quick index drive gear 132 which operatively connects the starting clutch drive shaft 116 and the long worm drive shaft 120. The high speed clutch 118 may be mounted on the long worm drive shaft 120 so that its plurality of friction discs engage the drive cup 134 of gear 130 when the friction discs are compressed. When the discs are not compressed, gear 130 freewheels on long worm drive shaft 120. The high speed clutch 118 acts to engage the high speed drive train by selectively engaging quick index driven gear 130 which is engaged and driven by quick index drive gear 132. High speed clutch 118 may be a six-disc friction clutch with an adjustable torque capacity with varying pressure. Its torque capacity with varying pressure is substantially identical to that of the machine brake clutch 114 in the exemplary embodiment.

The snubbing clutch 122 may also be a pneumatically operated multi-disc friction clutch. It is positioned on the long worm drive shaft 120 adjacent and spaced from the high speed clutch 118. Snubbing clutch 122 is mounted to a fixed bracket 136 which is attached to bracket 126 with suitable fasteners. The snubbing clutch is selectively engaged to control the speed of the long worm drive shaft 120 for controlling the speed of the main drum shaft. Since snubbing clutch 122 is pneumatically operated, it can be selectively engaged for short periods of time to achieve a quick deceleration of the long worm drive shaft 120 from a high speed to a low speed. The snubbing clutch 122 may be a two disc standard capacity clutch with an adjustable torque capacity with pressure. When the friction discs of snubbing clutch 122 are compressed, they engage the cup 138 fastened to bracket 136 to slow the long worm drive shaft 120 down or even slow it to a halt.

Snubbing brake clutch 122 when engaged causes friction discs to engage cup 138 of bracket 136 which selectively controls the speed of the long worm drive shaft 120 by slowing it down for quick deceleration from a high speed to a low speed or even to a complete stop.

As the timing shaft rotates, it eventually puts the multi-spindle machine into operation with power being supplied through the high speed drive train. The high speed drive train moves the main shaft for withdrawing the tool slides at a high rate of speed. During this time, the tool slides are withdrawn from the work piece and the revolving head indexes one position. Then, stock may be fed into position using a combination of high and low speeds as previously discussed. The braking operation, which occurs during or prior to the feeding of stock into the machine, may comprise employing the brake clutch 114 and/or the snubbing clutch 122.

Next in the exemplary embodiment, the tools return to their working position at high speed. When the timing shaft rotates further, the multi-spindle machine may then shift from the high speed back to the low speed. During this time the tools perform work on the work piece. The foregoing process keeps repeating itself as parts are produced by the machine.

The operation of the system of the present invention enables a slowing of the advancing stock during its feeding into the machine to minimize or prevent stock bounce back to ensure more accurate initial positioning of the stock in the machine.

It is to be understood that while the foregoing description of the present invention relates particularly to its use in connection with a Davenport Model B Five Spindle automatic screw machine, the present invention can be generally applied with any cam operated multi-spindle machine having high and low speeds and the capability of employing a brake arrangement.

An exemplary embodiment of the present invention may be viewed as having a stock feeder control system for a multiple spindle machine. The stock feeder control system includes a brake system operative to slow the speed of a feeder mechanism during a stock feeding operation. The brake system may comprise a machine controller, a brake arrangement, a machine brake clutch, and/or a snubbing clutch. The brake system is operative to slow the speed of the feeder mechanism prior to engagement of the stock and the stock stop device. The brake system is operatively responsive to a detection system detecting that the stock has obtained a predetermined feeding position during the stock feeding operation. The detection system may comprise one or more sensors. For example, the sensors may be proximity sensors and/or pressure sensors. The detection system may determine that the stock has traveled an acceptable distance, or that the stock has reached a predetermined braking position, prior to initiating braking. The predetermined feeding position may comprise an acceptable range of distances.

Thus, a multi-spindle machine and stock positioning method of feed stock of the present invention achieves the above stated objectives, eliminates difficulties encountered in the use of prior devices and systems, solves problems and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

I claim:

1. A controller arrangement for a multiple spindle machine operable at a low speed or a high speed and having a starting clutch drive shaft and a long worm drive shaft, the controller arrangement comprising:
 a stock feeder mechanism, wherein the feeder mechanism enables feeding of stock into the machine at the high speed,
 a brake arrangement, wherein the brake arrangement is operative to slow the speed of the feeder mechanism; and
 a machine controller, wherein the controller is operative to control the braking arrangement to slow the speed of the feeder mechanism during stock feeding.

2. The controller arrangement of claim 1
 wherein the brake arrangement enables slowing of the rotation of a drive shaft,
 wherein the feeder mechanism is operatively responsive to the machine controller,
 wherein the brake arrangement is operatively responsive to the machine controller.

3. The controller arrangement of claim 2 wherein the feeder mechanism is operable at the high speed and at a lower speed, and wherein the machine controller is operative to control the braking arrangement to switch the speed of the feeder mechanism from the high speed to the lower speed.

4. The controller arrangement of claim 3 wherein the machine further has a stock stop device for engaging with a stock during a stock feeding operation, wherein the machine controller is operative to switch the speed of the feeder mechanism prior to engagement of the stock and the stock stop device.

5. The controller arrangement of claim 4 wherein the feeder mechanism is operable at the machine low speed or the machine high speed, and wherein the machine controller is operative to control the braking arrangement to switch the speed of the feeder mechanism from the machine high speed to the machine low speed.

6. The controller arrangement of claim 5 wherein the braking arrangement comprises a machine brake clutch.

7. The controller arrangement of claim 5 wherein the braking arrangement comprises a snubbing clutch.

8. A method for feeding stock into a multiple spindle machine at a low speed or a high speed, the multiple spindle machine having a timing shaft, a starting clutch drive shaft, a long worm drive shaft, a brake arrangement, and a machine controller, and a stock feeder mechanism, wherein the feeder mechanism enables feeding of stock into the machine at the high speed, wherein the brake arrangement is operative to slow the speed of the feeder mechanism, and wherein the controller is operative to control the braking arrangement to slow the speed of the feeder mechanism, the method comprising:
 operating the machine at the high speed;
 operating the feeder mechanism; and operating the brake arrangement to slow the speed of the feeder mechanism during stock feeding.

9. The method of claim 8 wherein prior to the step of operating the brake arrangement, operating the controller to control the braking arrangement to slow the rotation of a drive shaft.

10. The method of claim 9 wherein the step of operating the feeder mechanism further comprising operating the feeder mechanism at the high speed.

11. The method of claim 10 wherein the machine further has a stock stop device for engaging with a stock during a stock feeding operation, and further comprising operating the machine controller to slow the speed of the feeder mechanism prior to engagement of the stock and the stock stop device.

12. The method of claim 11 wherein subsequent to the step of operating the brake arrangement, operating the feeder mechanism at the low speed.

13. The method of claim 12 wherein the step of operating the brake arrangement comprises operating a machine brake clutch.

14. The method of claim 12 wherein the step of operating the brake arrangement comprises operating a snubbing clutch.

15. A stock feeder control system for a multiple spindle machine, the control system comprising:
   a stock feeder mechanism, wherein the feeder mechanism enables feeding of stock into the machine during a stock feeding operation,
   a stock stop device adapted for engagement with a stock during the stock feeding operation, and
   a brake system operative to slow the speed of the feeder mechanism during the stock feeding operation.

16. The stock feeder control system of claim 15 wherein the brake system is operative to slow the speed of the feeder mechanism prior to engagement of the stock and the stock stop device, wherein the brake system is adapted to reduce bounce back distance of the stock from the stock stop device.

17. The stock feeder control system of claim 16 further including
   a detection system adapted to determine that the stock has obtained a predetermined feeding position during the stock feeding operation, wherein the brake system is operatively responsive to the detection system determining.

18. The stock feeder control system of claim 17 wherein the detection system is adapted to detect the stock at the predetermined feeding position prior to engagement of the stock and the stock stop device.

19. The stock feeder control system of claim 18 wherein the feeder mechanism is operable at a machine high speed or a machine low speed, and wherein the brake system is operative to switch the speed of the feeder mechanism from the machine high speed to the machine low speed.

20. The stock feeder control system of claim 15 further including
   a detection system adapted to detect the stock at a predetermined feeding position during the stock feeding operation, wherein predetermined feeding position is prior to engagement of the stock and the stock stop device, and wherein the brake system is operatively responsive to the detection system detecting the stock.

* * * * *